United States Patent
Badge et al.

(10) Patent No.: US 10,237,325 B2
(45) Date of Patent: Mar. 19, 2019

(54) MULTIPLE DEVICE CO-BROWSING OF A SINGLE WEBSITE INSTANCE

(71) Applicant: Avaya Inc., Basking Ridge, NJ (US)

(72) Inventors: Gaurav Moreshwar Badge, Pune (IN); Deep Subhash Pai, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 658 days.

(21) Appl. No.: 13/734,663

(22) Filed: Jan. 4, 2013

(65) Prior Publication Data

US 2014/0195588 A1    Jul. 10, 2014

(51) Int. Cl.
*H04L 29/08* (2006.01)
*H04L 29/06* (2006.01)

(52) U.S. Cl.
CPC .......... *H04L 67/02* (2013.01); *H04L 65/403* (2013.01)

(58) Field of Classification Search
CPC .............................. H04L 65/403; H04L 67/02
USPC .......................... 709/203, 217, 219, 223, 224
See application file for complete search history.

(56) References Cited

U.S. PATENT DOCUMENTS

| | | | |
|---|---|---|---|
| 629,551 A * | 7/1899 | Dawson et al. | 89/20.2 |
| 5,862,330 A * | 1/1999 | Anupam | G06F 17/30873 707/E17.111 |
| 6,199,096 B1 * | 3/2001 | Mirashrafi | G06F 17/30873 707/E17.111 |
| 6,295,551 B1 * | 9/2001 | Roberts | G06F 9/44526 709/203 |
| 6,668,273 B1 * | 12/2003 | Rust | G06F 17/30873 707/E17.111 |
| 6,871,213 B1 | 3/2005 | Graham et al. | |
| 7,287,054 B2 | 10/2007 | Lee et al. | |
| 7,660,899 B2 * | 2/2010 | Gavrilescu | G06F 17/30873 709/204 |
| 7,979,909 B2 | 7/2011 | Jancula et al. | |
| 8,682,977 B1 | 3/2014 | Roy et al. | |
| 8,806,024 B1 * | 8/2014 | Toba Francis | G06F 17/30873 709/227 |
| 9,112,975 B2 * | 8/2015 | Sayko | H04M 3/5191 |
| 2002/0032731 A1 | 3/2002 | Qian | |
| 2002/0049812 A1 | 4/2002 | Nahon | |
| 2003/0225836 A1 * | 12/2003 | Lee | H04M 3/567 709/205 |
| 2004/0225716 A1 | 11/2004 | Shamir et al. | |
| 2005/0097159 A1 * | 5/2005 | Skidgel | G06F 17/30873 709/200 |
| 2005/0197922 A1 | 9/2005 | Pezaris et al. | |
| 2005/0251006 A1 | 11/2005 | Dellis | |
| 2006/0129642 A1 | 6/2006 | Qian et al. | |

(Continued)

FOREIGN PATENT DOCUMENTS

WO    2012131688 A2    10/2012

*Primary Examiner* — Lashonda T Jacobs (57) ABSTRACT

Embodiments described herein provide systems and method for allowing multiple devices to browse the same instance of a website. In a particular embodiment, a method provides receiving an instruction in the co-browsing system to initiate a co-browsing session for a website with a first client and a second client. The method further provides acquiring the website from a server that hosts the website and rendering the website in the co-browsing system to generate a rendered image of the website. The method further provides transferring a first copy of the rendered image to the first client and a second copy of the rendered image to the second client.

18 Claims, 7 Drawing Sheets

(56) References Cited

U.S. PATENT DOCUMENTS

| | | | |
|---|---|---|---|
| 2006/0149567 A1 | 7/2006 | Muller | |
| 2007/0143423 A1 | 6/2007 | Kieselbach | |
| 2008/0046976 A1 | 2/2008 | Zuckerberg | |
| 2008/0052377 A1* | 2/2008 | Light | G06Q 10/107 709/218 |
| 2008/0127276 A1 | 5/2008 | Kim | |
| 2009/0164581 A1* | 6/2009 | Bove | G06F 17/30873 709/205 |
| 2009/0328135 A1 | 12/2009 | Szabo et al. | |
| 2010/0082747 A1* | 4/2010 | Yue | G06F 17/30873 709/204 |
| 2010/0131868 A1* | 5/2010 | Chawla | G06F 3/044 715/759 |
| 2010/0218105 A1* | 8/2010 | Perov | G06F 17/30873 715/738 |
| 2010/0250756 A1* | 9/2010 | Morris | G06F 17/30899 709/228 |
| 2010/0306642 A1* | 12/2010 | Lowet | G06F 17/30873 715/234 |
| 2010/0306834 A1 | 12/2010 | Grandison | |
| 2010/0318571 A1 | 12/2010 | Pearlman | |
| 2011/0083101 A1 | 4/2011 | Sharon | |
| 2011/0119352 A1* | 5/2011 | Perov | G06F 17/30873 709/218 |
| 2011/0126290 A1 | 5/2011 | Krishnamurthy et al. | |
| 2011/0202881 A1 | 8/2011 | Singh | |
| 2011/0258316 A1 | 10/2011 | Rizk | |
| 2011/0313915 A1 | 12/2011 | Tang | |
| 2012/0005598 A1 | 1/2012 | Burckart et al. | |
| 2012/0030288 A1* | 2/2012 | Burckart | G06F 17/30873 709/205 |
| 2012/0047449 A1* | 2/2012 | Burckart | G06F 17/30899 715/753 |
| 2012/0110472 A1 | 5/2012 | Amrhein | |
| 2012/0210243 A1* | 8/2012 | Uhma | G06F 17/30893 715/744 |
| 2012/0210244 A1 | 8/2012 | de Francisco Lopez | |
| 2012/0245955 A1 | 9/2012 | Bari | |
| 2012/0284801 A1 | 11/2012 | Goodwin et al. | |
| 2012/0303702 A1 | 11/2012 | Richter et al. | |
| 2012/0303703 A1 | 11/2012 | Richter et al. | |
| 2013/0091172 A1 | 4/2013 | Kelesis | |
| 2013/0129074 A1 | 5/2013 | Peterson et al. | |
| 2013/0129075 A1 | 5/2013 | Whitaker | |
| 2013/0176333 A1 | 7/2013 | Agar et al. | |
| 2013/0205375 A1 | 8/2013 | Woxblom et al. | |
| 2013/0218964 A1 | 8/2013 | Jakobson | |
| 2014/0019534 A1* | 1/2014 | Handrigan | G06F 17/30873 709/204 |
| 2014/0053085 A1* | 2/2014 | Stephure | H04L 41/0253 715/753 |
| 2014/0195588 A1 | 7/2014 | Badge et al. | |
| 2014/0207872 A1* | 7/2014 | Roy | H04L 65/403 709/205 |
| 2014/0258889 A1* | 9/2014 | Badge | G06F 17/30873 715/760 |
| 2015/0058407 A1* | 2/2015 | Uhma | G06F 17/30893 709/203 |
| 2015/0067181 A1* | 3/2015 | Roy | H04L 67/1095 709/227 |
| 2015/0142573 A1 | 5/2015 | Chien et al. | |

* cited by examiner

FIGURE 3 www.examplesite.com/orderform

500

Email Address

First Name

Last Name

Credit Card Number

Billing ZIP Code

◯ I have read and agree to the terms of service.

SUBMIT

Click here for agent assistance

MULTIPLE DEVICE CO-BROWSING OF A SINGLE WEBSITE INSTANCE

TECHNICAL BACKGROUND

Modern websites allow a user to accomplish a myriad of tasks online from the user's computing device whether the device be a laptop, desktop, smartphone, tablet, or otherwise. These tasks may include retrieving information, purchasing items, creating content, communicating with other users, or any other online activity. While a website allows a user to accomplish one or more tasks, the website does not allow for multiple users to have the same experience without those users present at the same computing device. In particular, even though multiple users can each direct their respective computing devices to retrieve the same website, those users will each be interacting with a separate and independent instance of the website. Therefore, if one of the users interacts with the website on his or her computing device, the interactions of that user have no effect on the experience of the other users. Moreover, the devices of each user may be different types of devices, may be running different operating systems, and/or rendering the website using different web browsers, which may cause the website to be displayed differently on each device.

Overview

Embodiments described herein provide systems and method for allowing multiple devices to browse the same instance of a website. In a particular embodiment, a method provides receiving an instruction in the co-browsing system to initiate a co-browsing session for a website with a first client and a second client. The method further provides acquiring the website from a server that hosts the website and rendering the website in the co-browsing system to generate a rendered image of the website. The method further provides transferring a first copy of the rendered image to the first client and a second copy of the rendered image to the second client.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
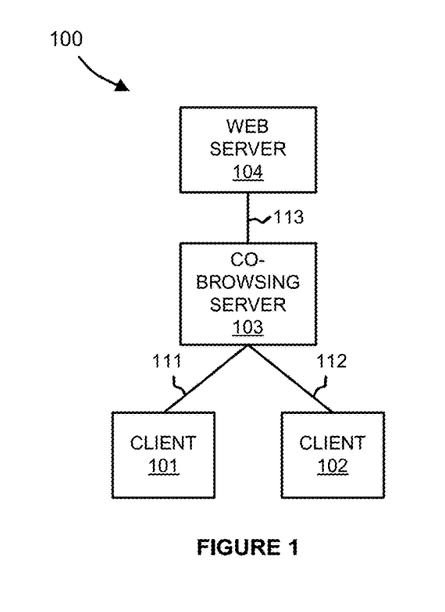
FIG. 1 illustrates a co-browsing system for allowing multiple devices to browse the same instance of a website.

FIG. 1 illustrates co-browsing system 100. Co-browsing system 100 includes client 101, client 102, co-browsing server 103, and web server 104. Client 101 and co-browsing server 103 communicate over communication link 111. Client 102 and co-browsing server 103 communicate over communication link 112. Co-browsing server 103 and web server 104 communicate over communication link 113.

In operation, clients 101 and 102 are executing on computing devices, such as laptop computers, desktop computers, tablet computers, and smartphones. Clients 101-102 may be executing within a web browsing application that is also executing on their respective computing devices or may be independent applications. Clients 101 and 102 may be installed as extensions or plugins within their respective web browsers or software for the clients may be transferred from co-browsing server 103 as needed. Client software may take the form of a web standard, such as HTML 5 or Java, so that the web browser on a device does not require additional plugins or extensions in order to execute clients 101 and 102. While a typical web browsing application is able to retrieve a website from web server 104, clients 101 and 102 allow for the same instance of the website to be viewed on multiple computing devices via co-browsing server 103.

Furthermore, clients 101 and 102 allow for the website to be displayed in the same manner on the devices executing clients 101 and 102. Thus, even if the devices executing clients 101 and 102 are different types of devices, which may have different display resolutions, running different operating systems, and/or running different web browsers having different browsing engines, clients 101 and 102 allow for the display of the website to remain consistent between the two devices.

Figure 2:
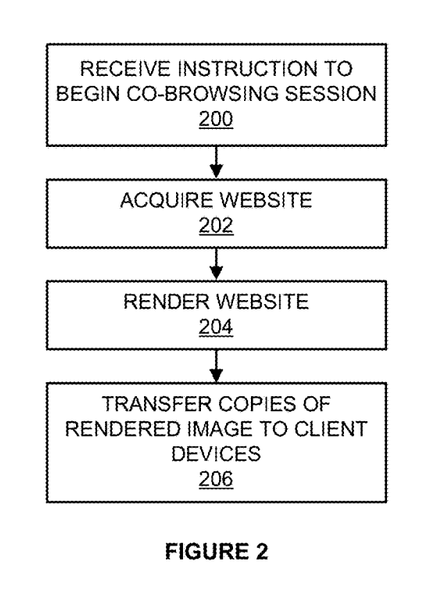
FIG. 2 illustrates the operation of the co-browsing system for allowing multiple devices to browse the same instance of a website.

FIG. 2 illustrates the operation of co-browsing system 100 for allowing multiple devices to browse the same instance of a website. Co-browsing server 103 receives an instruction to initiate a co-browsing session for a website with a first client and a second client (step 200). The instruction may include a web address for retrieving the website from web server 104, identifiers for clients that will participate in the co-browsing session, and any other information that may be useful when establishing a co-browsing session. The instruction may be received from the computing device executing either client 101 or client 102. The instruction may be transferred in response to a user input. For example, a user of a first computing device may select a link in a website, email message, or elsewhere, that directs the first computing device to open client 1 and connect with co-browsing server 103. Alternatively, the user may open client 1 and indicate within client 1 that the user desires to establish a co-browsing session of a website by providing the website and identifiers for other clients that will participate the session.

After receiving the instruction to initiate a co-browsing session, co-browsing server 103 acquires the website from web server 104 (step 202). Co-browsing server 103 may acquire the website using the same protocols, including the Hypertext Transfer Protocol (HTTP), that a typical web browser would use to acquire website data. Accordingly, web server 104 may not be able to recognize a different between co-browsing server 103 acquiring the website data and a typical web browsing application acquiring the website data.

Co-browsing server 103 renders the received website to generate a rendered image of the website (step 204). Co-browsing server 103 may use any browser engine to render the website. A browser engine uses content information and formatting information to generate an image of a website. The content information may be received from web server 104 in HyperText Markup Language (HTML), Extensible Markup Language (XML), image files, or some other format—including combinations thereof. The formatting information may be received from web server 104 in Cascading Style Sheets (CSS), Extensible Stylesheet Language (XSL), or some other format—including combinations thereof. Examples of a browser engine may include Webkit, Gecko, Trident, or any other browser engine. The rendered image is what would be displayed by a web browsing application after rendering the website.

Co-browsing server 103 transfers a first copy of the rendered image to the client 101 and a second copy of the rendered image to client 102 (step 206). The image may be transferred to the client in a remote image buffer protocol, such as the remote framebuffer (RFB) format used in Virtual Network Computing (VNC). Clients 101 and 102 then display the first and second copies of the rendered image, respectively. In order to ensure that both client 101 and 102 are displaying the same image, co-browsing server 103 may format the image so that both clients display the same image area. For example, a page of a website may include more information than can be displayed in the space provided by a web browser window and, therefore, requires scrolling to view the additional information. Even if one client has a larger viewing area, the viewable area on that client will still display the same information as is displayed on the other client with a smaller viewing area. Co-browsing server 103 may also transfer audio information to clients 101 and 102 if the website includes audible information.

In some embodiments, additional rendered image copies may be transferred to client devices 101 and 102. Co-browsing server 103 may continually transfer images at a frame rate based on network speed, client 101 or 102 preferences, server 103 preferences in order to ensure clients 101 and 102 display a current rendering of the website. For example, the website may include animations, video, or some other visual feature that changes over time as the website is being displayed. In order to ensure that a user of client 101 or 102 is able to view these changes, co-browsing server 103 transfers render images to clients 101 and 102 that reflect the changes. In an alternative embodiment, the images may only be transferred when something changes in the rendered image of the website so as to limit the resources used to transfer unchanged images.

Clients 101 and 102 may further allow their respective users to interact with the displayed websites. These interactions may include clicking on links, entering information into text boxes, scrolling around the displayed web page, or any other way that a user may interact with a website. Upon receiving the user input, the client transfers the input information to co-browsing server 103. Co-browsing server 103 applies the input to the website, updates the rendered website image in accordance with the user input, and transfers copies of the updated rendered website image to clients 101 and 102. For example, if the user scrolls to a different area of the web page, then the rendered image will be updated to display the new area of the web page. Likewise, if the user inputs text, the text will be displayed in an updated image.

Moreover, co-browsing server 103 may need to retrieve additional information from web server 104 in response to the user input. For example, if the user clicks on a link, then co-browsing server may need to retrieve information corresponding to a new web page or some other information corresponding to the link. Co-browsing server 103 then uses that information to render a new image.

In accordance with the above embodiments, using client 101 or 102, a user is able to view and interact with the website in the same manner as the user would if the website were rendered on a web browser local to the user's device. Since a copy of the same rendered website image is displayed at both clients, users of both clients are able to interact with the website as though the users were interacting with the website on the same client. Moreover, the use of co-browsing server 103 allows the website to be displayed in the same manner at both clients independent of which type of device each of the clients are executing on, which operating system each device is using, and which web browser each client is using.

It should be understood that while the embodiments discussed above include only two clients, the embodiments could be expanded to include any number of clients. Co-browsing server 103 would simply transfer additional copies of the rendered image to the additional clients.

Referring back to FIG. 1, clients 101 and 102 are executing on respective computing devices that each comprise computer processing circuitry and communication circuitry. The communication circuitry may be wireless, wireline, or both. The computing devices may each also include a user interface, memory device, software, or some other communication components. The computing devices may each be a telephone, computer, e-book, mobile Internet appliance, media player, game console, or some other computing apparatus—including combinations thereof.

Co-browsing server 103 comprises a computer system and a communication interface. Co-browsing server 103 may also include other components such a router, data storage system, and power supply. Co-browsing server 103 may reside in a single device or may be distributed across multiple devices. Co-browsing server 103 is shown externally to web server 104, but co-browsing server 103 could be integrated within the components of web server 104.

Web server 104 comprises a computer system and communication interface. Web server 104 may also include other components such a router, data storage system, power supply, and any further components that may be used for providing websites to web browsing applications. Web server 104 may reside in a single device or may be distributed across multiple devices.

Communication links 111-113 use metal, glass, air, space, or some other material as the transport media. Communication links 111-113 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 111-113 could be direct links or may include intermediate networks, systems, or devices.

Figure 3:
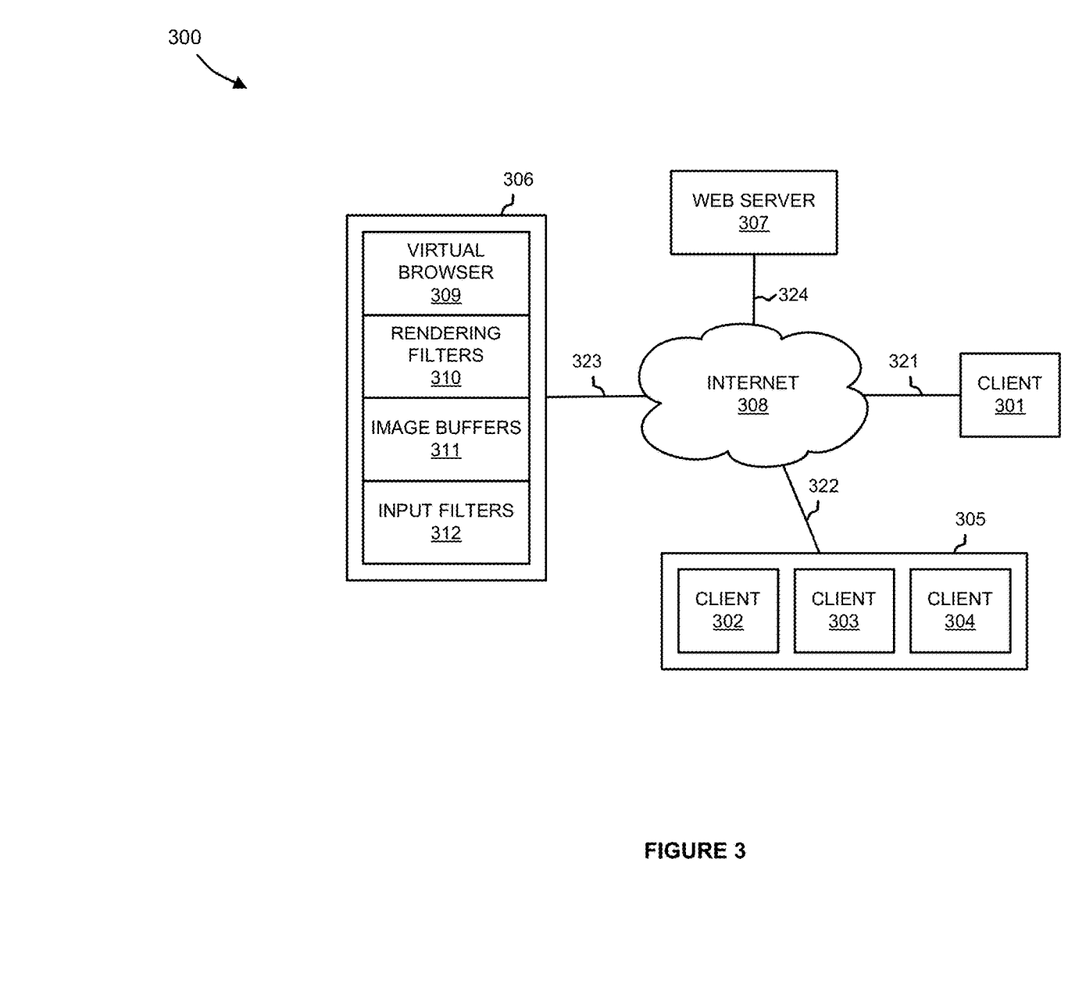
FIG. 3 illustrates a co-browsing system for allowing multiple devices to browse the same instance of a website.

FIG. 3 illustrates co-browsing system 300. Co-browsing system 300 includes client 301, clients 302-304 located within support center 305, co-browsing server 306, web server 307, and Internet 308. Co-browsing server 306 includes virtual web browser 309, rendering filters 310, image buffers 311, and input filters 312. Client 301 and Internet 308 communicate over communication link 321. Support center 305 and Internet 308 communicate over communication link 322. Co-browsing server 306 and Internet 308 communicate over communication link 323. Web server 324 and Internet 308 communicate over communication link 324.

While shown separately, web server 307 and co-browsing server 306 may be incorporated within one another or may be collocated such that they communicate over a local area network rather than Internet 308. Similarly, support center 305 and either web server 307, co-browsing server 306, or both may be collocated. Alternatively, support center 305 may be a virtual center with clients 302-304 distributed in multiple locations and accessing Internet 308 on separate links. Additionally, client 301, support center 305, co-browsing server 306, web server 307 may access Internet 308 through one or more access providers.

In operation, agents operate clients 302-304 to assist customers or, some other types of user, with issues that the customer may have. In some embodiments, support center 305 may be associated with an entity from which the customer requires support. For example, web server 307 may include a website for a company and support center 305 provides support to customers using the company's website. If necessary, co-browsing server 306 may be used for an agent operating one of clients 302-304 to provide the customer with website support.

Figure 4:
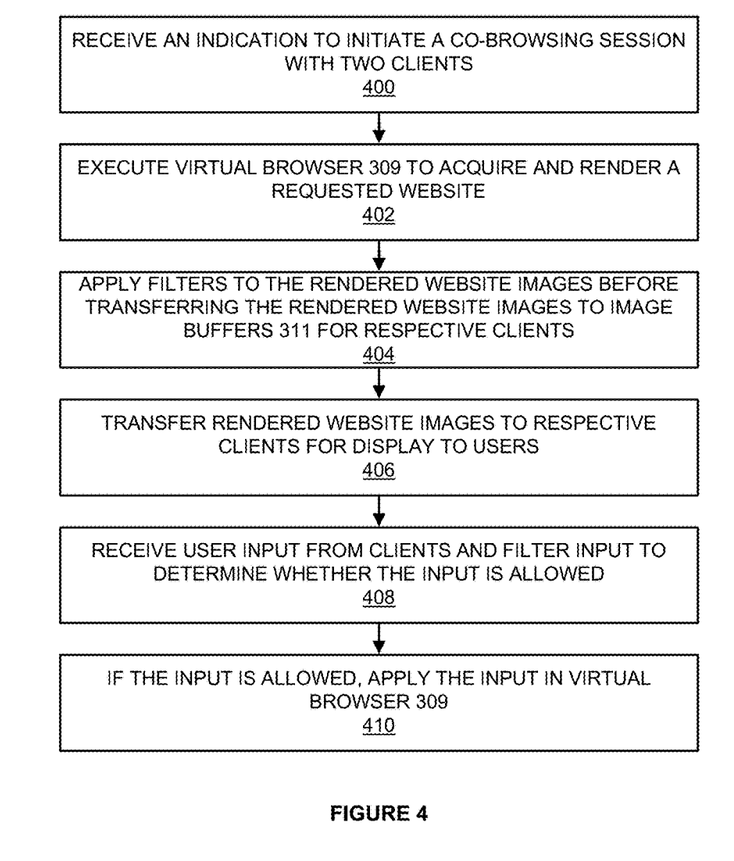
FIG. 4 illustrates the operation of the co-browsing system for allowing multiple devices to browse the same instance of a website.

FIG. 4 illustrates the operation of co-browsing system 300 for allowing multiple devices to browse the same instance of a website. Co-browsing system receives an indication to initiate a co-browsing session between two clients (Step 400). In this example, a customer that is operating client 301 desires to participate in a co-browsing session with an agent operating one of clients 302-304 in support center 305. The desire may arise from difficulty navigating a website provided by web server 307, from a lack of knowledge of the web site's features, or for any other reason that the customer may desire assistance.

The indication to initiate the co-browsing session may be received from an agent of support center 305 or from a customer. For example, the customer may click a link on a web page, or elsewhere, that initiates the co-browsing session with an agent. Similarly, if a customer is already communicating with an agent, then the agent may transfer a link to the client for the client to initiate the co-browsing session. The link may be transferred over email, instant messaging, client-to-client messaging, or any other way of transferring a link. The content of the link may be generated by co-browsing system 306 itself, by a client, by web server 307, or by some other system or application. The information necessary to initiate the co-browsing session may be included in the link, may direct co-browsing server 306 to a location containing the information, may be a code that correspond to parameters created for the co-browsing session, or any other method of providing the co-browsing server with information necessary to initiate a co-browsing session.

In this embodiment, the request to initiate a co-browsing session indicates to co-browsing server 301 should initiate a co-browsing session between client 301 and client 302. Client 302 may be selected from support center clients 302-304 based on the agent operating client 302 already communicating with the customer operating client 301. Alternatively, if the agent is not already communicating with the customer, then a client may be randomly chosen, selected based on an agent distribution algorithm, or some other method for selecting a support center agent.

Virtual browser 309 then executes on co-browsing server 306 to acquire and render a website requested by the request to initiate the co-browsing session (step 402). Virtual browser 309 receives website data and renders the website data using a browser engine the same as or similar to a browser engine used in a typical web browser. The rendering of the website data results in an image that would be displayed to a user if virtual browser 309 were a typical web browser executing on a computing device. However, virtual browser 309 transfers the rendered website image to clients 301 and 302 as described below.

After the website is rendered, copies of the rendered images are created and rendering filters 310 are applied to the rendered image copies before transferring each copy to its respective image buffer in image buffers 311 (step 404). The filters may include identifying and obscuring information on a rendered image copy or otherwise modifying the rendered image copy. The filters may filter the rendered image copies based on the client to which a particular image copy is being sent. For example, a filter may obscure private customer information in a rendered image copy destined for client 302 operated by an agent while not obscuring the private customer information to client 301 operated by a customer. The filters may also apply differently to different agents so that certain agents who receive the rendered image copies are allowed to view private customer information while others are not. In some embodiments, a filter may provide an indicator on the rendered image copy of elements in the rendered image copy with which an agent is not allowed to interact.

After the filtered copies of the rendered website images are placed in their respective image buffer of image buffers 311, image buffers 311 transferred to client 301 and 302, respectively, for display to users of clients 301 and 302 (step 406). The image buffers are used as part of a remote image buffer protocol. The protocol is used between co-browsing server 306 and clients 301 and 302 to facilitate the remote website rendering described above. Clients 301 and 302 allow users to interact with the website image in the same way that a user would interact with a website using a typical web browser.

Upon receiving user input, clients 301 and/or 302 transfer an indication of the user input to co-browsing server 306 and input filters 312 filter the input to determine whether the input is allowed (step 408). For example, input received from client 301 of a customer may always be allowed while input from client 302 of an agent has limited input, such as the inability to select links that submit forms for the customer or any other type of input that an agent should not be allowed to perform. Input not allowed from client 302 may be the same input that is indicated by the filters in step 404.

If the input is allowed, virtual browser 309 applies the input to the website (step 410). When applying the input to the website, virtual browser 309 may need to send the indicated input to web server 307 in order to request more data from web server 307. For example, the input may select a link that directs to a new web page of the website that needs to be retrieved from web server 307. Alternatively, the input may simple change the appearance of the current web page, such as entering text, scrolling, or other type of input. Upon applying the input, virtual browser 309 renders the website according to the input and transfers the rendered website image to clients 301 and 302 through rendering filters 310 and image buffers 311, as described above.

In some embodiments, as both an agent and customer interact with a website through their respective clients, the session may be recorded in a storage system of co-browsing server 306 or elsewhere. The recording of the session may be performed by saving some or all of the rendered images that were transferred to clients. Additionally, co-browsing server 306 may save an indication of which client performed which inputs on the website during the session. Hence, when viewing a playback of a recorded co-browsing session, the saved indication allows a viewer to know which user performed which actions.

Figure 5:
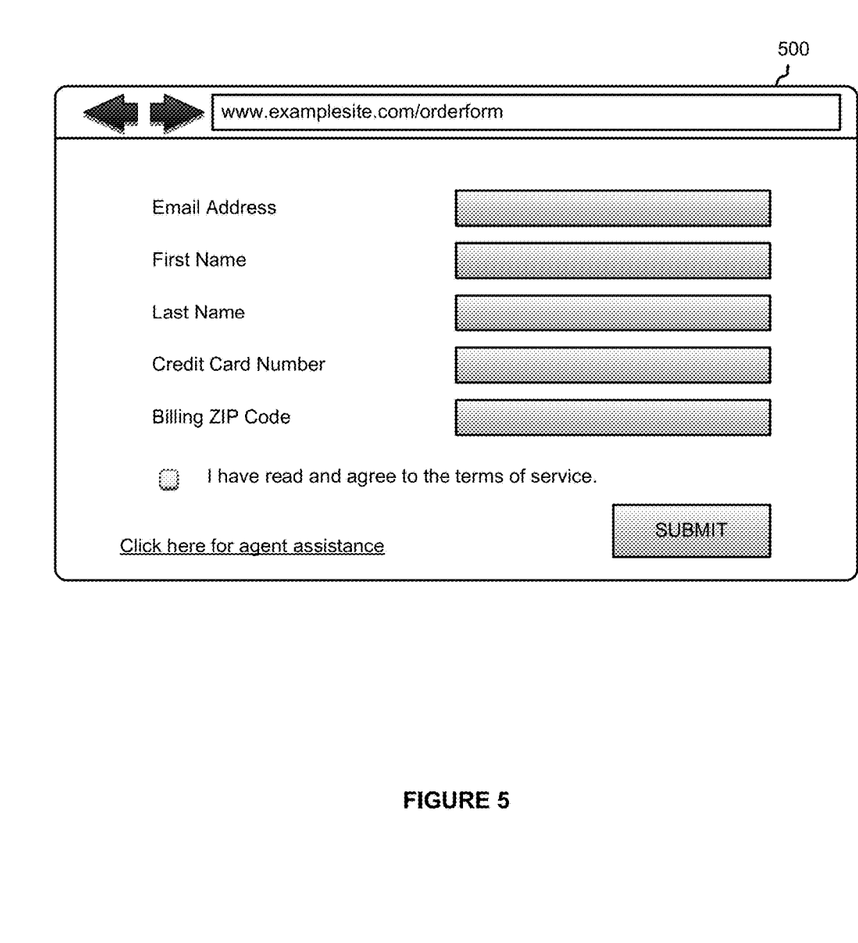
FIG. 5 illustrates a browser window for allowing multiple devices to browse the same instance of a website.

FIG. 5 illustrates web browser window 500 in an example of the above method. Web browser window 500 is displayed on a computing device of a customer trying to order something on a website, www.examplesite.com, and is a window of a web browser application executing on the computing device. The website is retrieved by the web browser from web server 307 without using co-browsing server 306 since a co-browsing session has not yet been initiated. Likewise, after receiving the website, the web browser application itself renders the website for display in window 500.

In this example, the customer is currently viewing the order form page of the website. The lower left corner of window 500 displays a link so that the customer clicks on the link to receive agent assistance with the website. Upon selecting the link, a message is sent to co-browsing server 306 to initiate a co-browsing session with an agent of the website. In addition to initializing a co-browsing session for the website, the link may open a chat window so that the customer can interact with the agent with which the customer will be co-browsing. Alternatively, the customer may be prompted to provide a telephone number so that the agent can call the customer during the co-browsing session.

Figure 6:
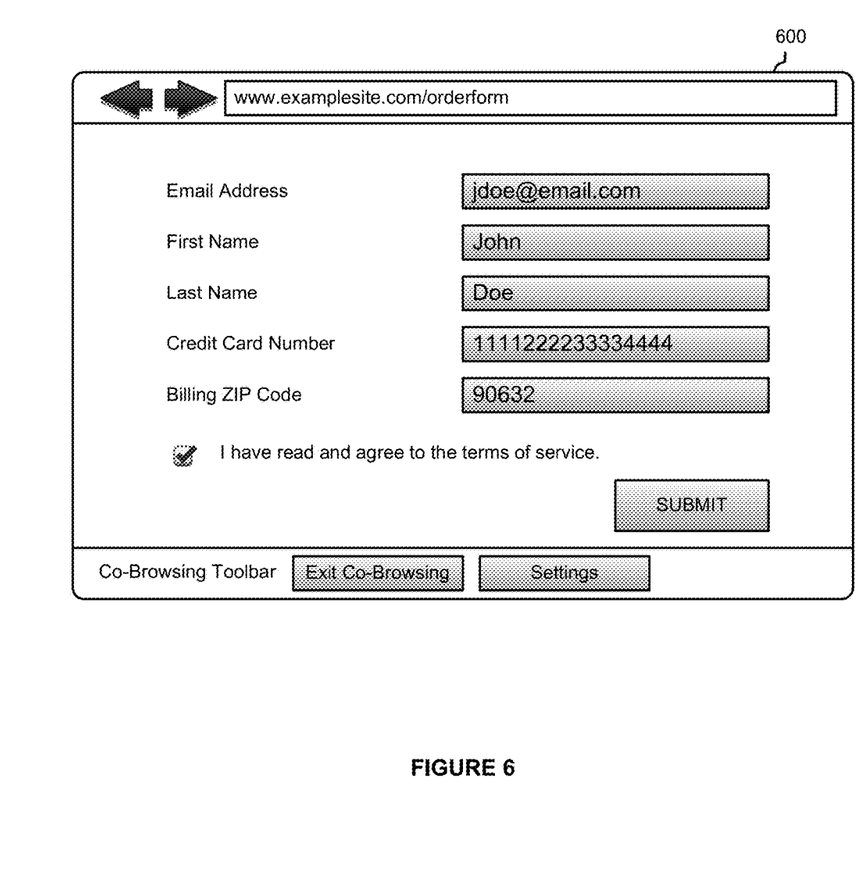
FIG. 6 illustrates a browser window for allowing multiple devices to browse the same instance of a website.

FIG. 6 illustrates web browser window 600 displaying the website to the customer during a co-browsing session. Co-browsing server 306 may receive indication that the customer clicked the link by receiving a message from web server 307 that the link was clicked, the link itself may have directed to co-browsing server 306, or any other method that an indication may be routed to co-browsing server 306.

After receiving notification that the customer clicked on the link, co-browsing server transfers information needed for the web browser on the customer's device to execute co-browsing client 301. The information may include the software for client 301 itself if client 301 is not already installed in the customer's web browser. Co-browsing client 301 may execute in web browser window 600 using standard web protocols, such as HTML5, so that the web browser does not need any plugins, extensions, or other modification to run client 301. Alternatively, client 301 may execute using Java, Flash, or any other type of web environment.

The co-browsing toolbar at the bottom of web browser 600 indicates to the customer that web browser window 600 is displaying client 301. While FIG. 6 displays the toolbar for client 301 at the bottom of window 600, the toolbar may assume any other position and take any other form to indicate that client 301 is executing. In addition to indicating that client 301 is executing, the toolbar may provide options for controlling client 301. For example, the co-browsing toolbar of FIG. 6 displays buttons to exit the co-browsing session and to bring up a settings menu. Exiting the co-browsing session closes client 301 after which web browser window 600 may be closed as well, reload the co-browsed website normally, go to a start page, or any other type of action that can be taken by a web browser. The settings menu may include options for display resolution of web pages, privacy settings for filters 310 and 312 in co-browsing server 306, or any other options that may be beneficial for a user in a co-browsing session.

Once co-browsing client 301 is executing, co-browsing server 306 can begin transferring images to client 301 of the web page that virtual browser 309 rendered after retrieving from web server 307. In this example, the web page is the same page that the customer was browsing before the customer selected the link described above. During the co-browsing session, the link no longer displays since the co-browsing session has already been initiated.

Once client 301 receives the image of the web page, client 301 displays the image in browser widow 600 for viewing and interaction by the customer. As additional images are received, client 301 further displays those images. The additional images may be received only when a change is made to the rendered image or at a periodic rate, such as a number of frames per second or some other rate. If the customer types information into the web page, client 301 sends the information to co-browsing server 306 so that virtual browser 309 can manipulate the web page accordingly. For example, if the customer types a 'j' to begin entering the customer's email address, a notification that a j has been typed is sent to co-browsing server 306. Virtual browser 309 then places a 'j' in the email text box, renders the web page image with a 'j' in the text box, and transfers the image to client 301 for display. This action is repeated for further input. Therefore, aside from possible network delay, the customer is able to view the web page input as though the web page is rendered in the web browsing application on the customer's local device.

Additionally, in a manner similar to that described above, client 301 will display rendered web page images that include input received from other parties on the co-browsing session. For example, if a support center agent is also on the co-browsing session, the agent may enter the customer's email address on behalf of the customer. Client 301 will display the email address in the web page image rendered by virtual browser 309 as the agent is typing.

Figure 7:
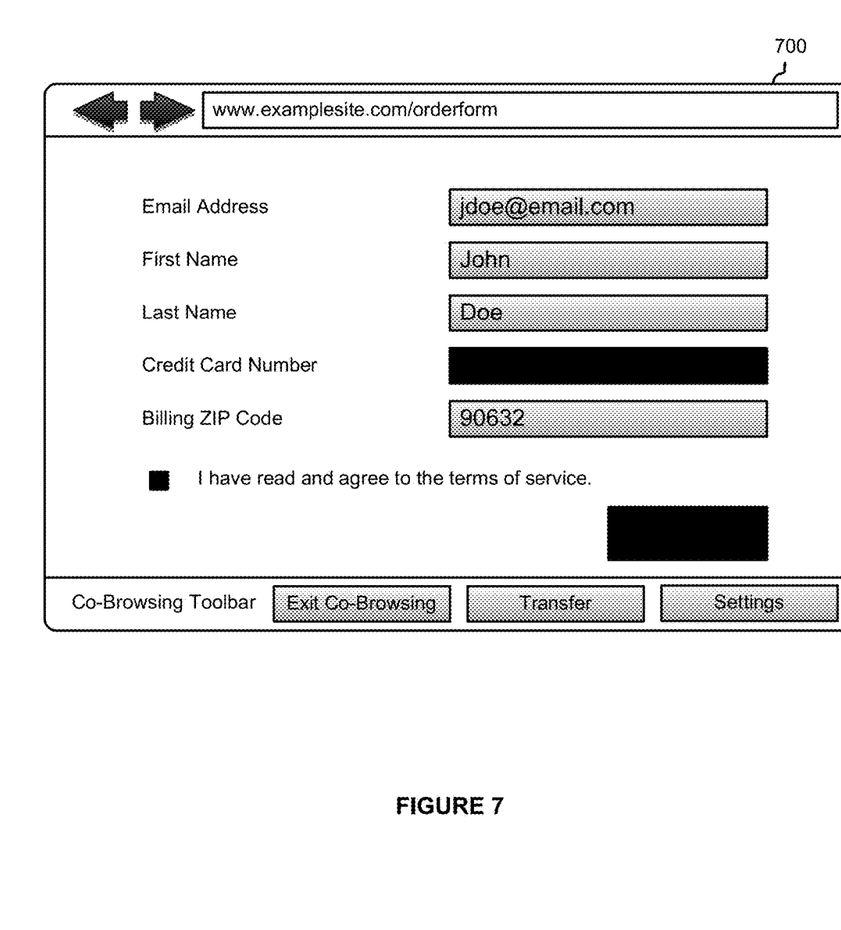
FIG. 7 illustrates a browser window for allowing multiple devices to browse the same instance of a website.

FIG. 7 illustrates web browser window 700 displaying the website to an agent during the co-browsing session. In this example, the co-browsing session is started with the agent operating client 302. Client 302 may execute in response to the agent being selected by co-browsing server 306 or some other system, such as a contact distribution system for support center 305. Client 302 may already be executing in browser window 700 or may execute in browser window 700 upon notification from co-browsing server 306 that a co-browsing session is beginning.

Client 302 displays the web page in browser window 700 almost exactly as the same web page is displayed to the customer in browser window 600. However, the rendering filters 310 block out the card number field so that anything typed into that field by the customer cannot be seen by the agent. Additionally, rendering filters 310 block out the check box and submit button so that the agent cannot make such selections on behalf of the customer. The rest of the web page is displayed to the agent in the same manner as client 301 displays the web page to the customer. This allows the agent to know exactly what the customer is looking at when assisting the customer. In some cases, client 302 may need to scale or resize the display match the display of the customer, as may be the case if the agent and the customer have display screens of differing resolutions.

As with client 301, client 302 will transfer any input from the agent to co-browsing server 306 so that virtual browser 309 can apply the input to the web page. Virtual browser 309 renders the web page in accordance with the input and the rendered image is transferred to both client 301 and 302 for display. Additionally, input filters 312 filter any input from client 302. Input filters 302 ensure that the agent is not entering any information into the credit card number text box, the terms of service check box, or pressing the submit button. If the agent does provide input into any of these areas despite the areas being blocked out, input filters 312 will identify the input and not transfer the input to virtual browser 309.

The toolbar for client 302 shown at the bottom of browser window 700 is similar to the toolbar of client 301. However, client 302 also has a transfer button. The transfer button allows the agent to transfer the co-browsing session to another agent. Thus, the agent may press the transfer button and indicate that co-browsing session should be transferred to the agent operating client 304. Upon receiving notification of the transfer, co-browsing 306 server will begin sending rendered web page images to client 304 instead of client 302 and client 304 will perform in a similar manner to client 302. The web page images transferred to client 304 may have the same rendering filter and image filter parameters as are applied to client 302 or may be subject to different parameters.

In some embodiments, the transfer button, or a separate button, may also provide the agent with the ability to conference one or more other agents into the co-browsing session. For example, the agent operating client 302 may indicate that the agent operating client 304 should be included in the co-browsing session. In response to the indication, co-browsing server 306 begins sending rendered web page images to client 304 in addition to clients 301 and 302. Thus, client 302 continues to participate in the session along with client 301 and 304 as a three party co-browsing session. The web page images transferred to client 304 may have the same rendering filter and input filter parameters as are applied to client 302 or may be subject to different parameters.

Figure 8:
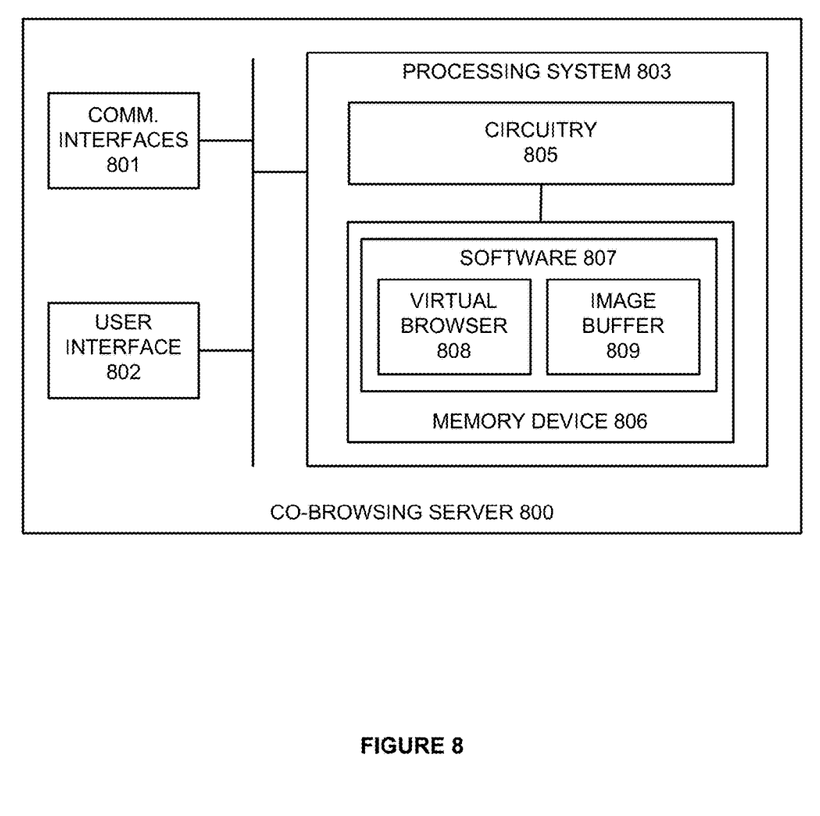
FIG. 8 illustrates a co-browsing server for allowing multiple devices to browse the same instance of a website.

FIG. 8 illustrates co-browsing server 800. Co-browsing server 800 is an example of co-browsing server 103, although server 103 may use alternative configurations. Co-browsing server 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software includes virtual browser module 808 and image buffer module 809. Operating software 807 may further include an operating system, utilities, drivers, network interfaces, applications, or some other type of software. When executed by circuitry 805, operating software 807 directs processing system 803 to operate co-browsing server 800 as described herein.

In particular, communication interface 801 receives an instruction in the co-browsing system to initiate a co-browsing session for a website with a first client and a second client. Virtual browser module 808 directs processing system 803 to acquire the website from a server that hosts the website and renders the website to generate a rendered image of the website. Image buffer module 809 directs processing system 803 to transfer a first copy of the rendered image to the first client and a second copy of the rendered image to the second client.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a co-browsing system, comprising:
   receiving an instruction in the co-browsing system to initiate a co-browsing session for a website with a first client and a second client;
   acquiring the website from a server that hosts the website;
   rendering the website in the co-browsing system to generate a rendered image of the website, wherein the rendered image comprises output of a browser engine in the co-browsing system, prior to display, that allows for a user to interact with the website by one or more of selecting a link in the website or entering information into an information entry field of the website;
   before transferring a second copy of the rendered image to the second client, applying a filter to the second copy of the rendered image that prevents at least one link of the website from being selected at the second client; and
   transferring, using a remote image buffer protocol, a first copy of the rendered image to the first client and the second copy of the rendered image to the second client.

2. The method of claim 1, wherein the remote image buffer protocol comprises remote framebuffer (RFB), and the method further comprising:
   displaying the first copy of the rendered image at the first client; and
   displaying the second copy of the rendered image at the second client.

3. The method of claim 1, wherein the first client and the second client each comprises a first co-browsing client executing within a web browser on a first device and the second client comprises a co-browsing client executing within a web browser on a second device.

4. The method of claim 1, wherein the filter also masks portions of the second copy of the rendered image so that the portions cannot be viewed at the second client.

5. The method of claim 1, wherein the at least one link includes a link that submits a form for a user at the first client.

6. The method of claim 1, further comprising:
at the first client, receiving user input into the first copy of the rendered image and transferring the user input to the co-browsing server;
rendering the website in the co-browsing server to generate a second rendered image of the website that accounts for the user input;
transferring a first copy of the second rendered image to the first client and a second copy of the second rendered image to the second client.

7. The method of claim 1, further comprising:
at the second client, receiving user input into the second copy of the rendered image and transferring the user input to the co-browsing server;
in the co-browsing server, filtering the user input to determine whether the user input is allowed to be entered from the second client;
if the user input is allowed, rendering the website in the co-browsing server to generate a second rendered image of the website that accounts for the user input;
transferring a first copy of the second rendered image to the first client and a second copy of the second rendered image to the second client.

8. The method of claim 1, further comprising:
receiving an instruction from the second client to transfer the co-browsing session to a third client;
transferring the second copy of the rendered image to the third client.

9. The method of claim 1, wherein the first client is executing within a web browsing application on a first device and the second client is executing within a web browsing application on a second device.

10. A co-browsing system, comprising:
a communication interface configured to receive an instruction initiate a co-browsing session for a website with a first client and a second client and acquire the website from a server that hosts the website;
a processing system configured to render the website to generate a rendered image of the website, wherein the rendered image comprises output of a browser engine in the co-browsing system, prior to display, that allows for a user to interact with the website by one or more of selecting a link in the website or entering information into an information entry field of the website, and, before a second copy of the rendered image is transferred to the second client, apply a filter to the second copy of the rendered image that prevents at least one link of the website from being selected at the second client; and
the communication interface further configured to transfer, using a remote image buffer protocol, a first copy of the rendered image to the first client and the second copy of the rendered image to the second client.

11. The co-browsing system of claim 10, wherein the remote image buffer protocol comprises remote framebuffer (RFB), the first client is configured to display the first copy of the rendered image, and the second client is configured to display the second copy of the rendered image.

12. The co-browsing system of claim 10, wherein the first client and the second client each comprises a first co-browsing client executing within a web browser on a first device and the second client comprises a co-browsing client executing within a web browser on a second device.

13. The co-browsing system of claim 10, wherein the filter also masks portions of the second copy of the rendered image so that the portions cannot be viewed at the second client.

14. The co-browsing system of claim 10, wherein the at least one link includes a link that submits a form for a user at the first client.

15. The co-browsing system of claim 10, further comprising:
the communication interface configured to receive, from the first client, user input into the first copy of the rendered image;
the processing system configured to render the website to generate a second rendered image of the website that accounts for the user input;
the communication interface further configured to transfer a first copy of the second rendered image to the first client and a second copy of the second rendered image to the second client.

16. The co-browsing system of claim 10, further comprising:
the communication interface configured to receive, from the second client, user input into the second copy of the rendered image;
the processing system configured to filter the user input to determine whether the user input is allowed to be entered from the second client and, if the user input is allowed, render the website to generate a second rendered image of the website that accounts for the user input;
the communication interface further configured to transfer a first copy of the second rendered image to the first client and a second copy of the second rendered image to the second client.

17. The co-browsing system of claim 10, further comprising:
the communication interface configured to receive an instruction from the second client to transfer the co-browsing session to a third client and transfer the second copy of the rendered image to the third client.

18. A non-transitory computer readable medium having instructions stored thereon for operating a co-browsing server, wherein the instructions, when executed by the co-browsing server, direct the co-browsing server to:
receive an instruction in the co-browsing system to initiate a co-browsing session for a website with a first client and a second client;
acquire the website from a server that hosts the website;
render the website in the co-browsing system to generate a rendered image of the website, wherein the rendered image comprises output of a browser engine in the co-browsing system, prior to display, that allows for a user to interact with the website by one or more of selecting a link in the website or entering information into an information entry field of the website;
before a second copy of the rendered image is transferred to the second client, apply a filter to the second copy of the rendered image that prevents at least one link of the website from being selected at the second client; and
transfer, using a remote image buffer protocol, a first copy of the rendered image to the first client and a second copy of the rendered image to the second client.

* * * * *